(12) United States Patent
Lee

(10) Patent No.: US 7,016,009 B2
(45) Date of Patent: Mar. 21, 2006

(54) METHOD FOR MANUFACTURING LIQUID CRYSTAL DISPLAY DEVICE WITH PARTICULAR PAD PROTECTION LAYERS

(75) Inventor: Jea Gu Lee, Taegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 4 days.

(21) Appl. No.: 09/894,881

(22) Filed: Jun. 29, 2001

(65) Prior Publication Data
US 2002/0044238 A1    Apr. 18, 2002

(30) Foreign Application Priority Data
Aug. 26, 2000 (KR) .............................. 2000-49846

(51) Int. Cl.
*G02F 1/13* (2006.01)

(52) U.S. Cl. ....................................................... 349/187
(58) Field of Classification Search ................ 349/110, 349/111, 152
See application file for complete search history.

(56) References Cited

U.S. PATENT DOCUMENTS

| | | | | |
|---|---|---|---|---|
| 5,703,666 A | * | 12/1997 | Saika et al. .................. | 349/110 |
| 5,731,856 A | * | 3/1998 | Kim et al. ................... | 349/147 |
| 6,256,079 B1 | * | 7/2001 | Matsushima ................ | 349/106 |
| 6,373,546 B1 | * | 4/2002 | Kim ..................... | 257/E29.151 |
| 6,429,916 B1 | * | 8/2002 | Nakata et al. .............. | 349/106 |

* cited by examiner

*Primary Examiner*—Frank G. Font
*Assistant Examiner*—Timothy L. Rude
(74) *Attorney, Agent, or Firm*—McKenna Long & Aldridge LLP

(57) ABSTRACT

A method of manufacturing an LCD panel that avoids erosion of a transparent conductive film. The method includes forming a TFT substrate with an active region and with a pad region having a transparent conductive film. The TFT substrate is covered with a light-shielding material. That light shielding material is patterned to form a black matrix in the active region and an erosion barrier film over the transparent conductive film in the pad region. Beneficially, the black matrix and the erosion barrier film are formed of the same material, using the same mask. Color filters are electrodeposited from an aqueous solution without erosion of the transparent conductive film in the pad region.

18 Claims, 11 Drawing Sheets

METHOD FOR MANUFACTURING LIQUID CRYSTAL DISPLAY DEVICE WITH PARTICULAR PAD PROTECTION LAYERS

This application claims the benefit of Korean Patent Application No. 2000-49846 filed on Oct. 23, 2000, which is hereby incorporated by reference as if fully set forth herein.

BACKGROUND OF THE INVENTION

1. Field of the Invention

The present invention relates to liquid crystal display devices, and more particularly, to a method of manufacturing a liquid crystal display (LCD) panel.

2. Background of the Related Art

With the rapid development of information communication, the importance of displays that image information is high. One device, the Cathode Ray Tube (CRT) can display a wide range of colors with excellent brightness. However, the need for high resolution, large screen portable display devices has lead to the development of flat panel displays. Flat panel displays are widely used for imaging in computers, spacecraft, and aircraft.

Flat panel displays include liquid crystal display (LCD), electroluminescent displays (ELD), field emission displays (FED), and a plasma display panels (PDP). An ideal flat panel display would be lightweight, have high luminance, high efficiency, and high resolution, would operate with a fast response time, using low voltage and with low power consumption, all at low cost, while producing natural colors. While not completely ideal, the active matrix color LCD panel has become widely used.

Generally, an active matrix color LCD panel is formed by attaching an active matrix substrate ("TFT" substrate) to a color filter substrate. While generally successful, misalignments between the two substrates can reduce manufacturing yield. One suggestion for preventing misalignment is to form color filters by electrodeposition. Electrodeposition uses potentials between gate and data pads to produce the color filters on the TFT substrate.

A related art method of manufacturing an LCD panel will now be described. FIG. 1 and FIGS. 2A–2E show plan views of a related art LCD panel. The related art LCD panel includes a TFT substrate and a color filter substrate. The TFT substrate has an active region and a pad region. The pad region includes a gate pad region Gpad and a data pad region Dpad.

A gate line 11 and a crossing data line 15 are arranged on the TFT substrate (see, for example, FIG. 2B). A TFT is located near the crossing. A pixel electrode 17 (see FIG. 2C) connects to the TFT. Additionally, R, G, B color filters are formed on the pixel electrode 17 by electrodeposition (see, FIG. 2E).

Referring now to FIG. 2A, a gate pad 11b is formed in the gate pad region. The gate pad 11b electrically connects to a gate driving circuit (not shown) and transmits driving signals to a gate line 11. Referring now to FIG. 2B, a data pad 15c is formed in the data pad region. The data pad 15c electrically connects to a data driving circuit (not shown) and transmits image signals to a data line 15.

For reference, although not shown, more than one gate pad and one data pad are formed. During manufacture the various pads are electrically shorted together by shorting bars to prevent damage to the thin film transistors that are formed as shown in FIG. 2C. The shorting bars are subsequently removed.

Referring now to FIG. 2D, a black matrix 19 is arranged on the color filter substrate to prevent light from leaking around the gate line 11 and the data line 15.

A method of manufacturing the aforementioned LCD panel will be described with specific reference to FIGS. 2A to 2E. As shown in FIG. 2A, a metal layer is formed, such as by sputtering, on an insulating substrate. That metal layer is then patterned to form a gate line 11 and a gate electrode 11a in an active region, and a gate pad 11b. As shown, the gate pad 11b extends to form a single conductive path with the gate line 11.

Afterwards, a gate insulating film (not shown) is formed over the exposed surfaces, including over the gate pad 11b, beneficially by chemical vapor deposition (CVD). A semiconductor layer 13 is then formed over the gate electrode 11a. The semiconductor layer 13 forms a TFT channel.

Referring now to FIG. 2B, subsequently, a metal layer is formed on the gate insulating film, such as by sputtering, and then patterned to form a data line 15 that crosses the gate line 11. Source and drain electrodes 15a and 15b on the semiconductor layer 13 are also formed, as is a data pad 15c in the data pad region Dpad. The data pad 15c extends to form a single body with the data line 15.

Then, a passivation film (not shown) is formed over the active region and the pad region. Then, as shown in FIG. 2C, a contact hole is formed to expose the drain electrode 15b and opening are formed to expose the gate pad 11b and the data pad 15c. A transparent conductive material is then formed over the exposed surfaces. The transparent conductive material is subsequently patterned to form a pixel electrode 17 that electrically connects with the drain electrode 15b through the contact hole. Additionally, transparent conductive films 17a that electrically connect with the gate pad 11b and the data pad 15c are also formed. Those films assist connecting the gate pad and the data pad to external driving circuits. Indium tin oxide (ITO) is usually used as the transparent conductive material.

As shown in FIG. 2D, a black matrix layer 19 is then formed. The black matrix layer 19 prevents light from leaking around the gate line 11, the data line 15 and the TFT. At this time, the transparent conductive films 17a that connect to the gate pad 11b and to the data pad 15c remain exposed.

Referring not to FIG. 2E, the TFT substrate is dipped in an aqueous solution. A voltage is then applied through the pixel electrode 17 where a first color filter will be formed. A first color filter layer 21a is then electrodeposited on a corresponding pixel electrode. A second color filter layer 21b and a third color filter layer (not shown) are formed in a similar manner.

Although not shown, a sealant is located at predetermined positions on the TFT substrate. The TFT substrate is then attached to an opposing substrate (not shown). By injecting and sealing a liquid crystal therebetween, the related art process for manufacturing the LCD panel is completed.

Unfortunately, the foregoing related art method of manufacturing an LCD panel has problems. When color filters are formed by electrodeposition, the color filter material is deposited from an aqueous solution. Since such aqueous solutions are typically corrosive, the exposed transparent conductive films of the pad regions are eroded. In other words, in the related art, when color filters are electrodeposited the transparent conductive films on the gate pad and on the data pad are exposed. The exposed transparent conductive films are eroded by the aqueous solution used for electrodeposition. Such erosion increases the ohmic contact resistance and reduces that device reliability.

To prevent the transparent conductive films from being eroded those films could be masked before electrodeposition. However, masking requires a separate mask and additional processing steps, thereby increasing the manufacturing cost and complexity. Therefore, a new method of manufacturing an LCD panel in which transparent conductive films are protected from erosion would be beneficial. Even more beneficial would be such a method that does not require a separate mask or additional processing steps.

SUMMARY OF THE INVENTION

Accordingly, the present invention is directed to a method for manufacturing an LCD panel that substantially obviates one or more of the problems due to limitations and disadvantages of the related art.

An object of the present invention is to provide a method of manufacturing an LCD panel in which a transparent conductive film is prevented from being eroded, and which does not require a separate mask or additional processing steps.

Additional features and advantages of the invention will be set forth in the description that follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages, a method of manufacturing an LCD panel includes the steps of forming a light-shielding material layer on a TFT substrate, patterning the light-shielding material layer to form both a light-shielding film in the active region and an erosion barrier film in a pad region, and then forming color filters in the active region.

In the preferred embodiment, the erosion barrier film masks the transparent conductive film where erosion may occur during color filter formation. Furthermore, the color filters are beneficially formed by electrodeposition. The erosion barrier film is preferably formed of the same material as the light-shielding film, at the same time, and using one mask.

The erosion barrier film is beneficially not formed where a sealant is to be located. The reason being that an erosion barrier film typically has poor adhesion with sealants, which results in poor bonding of the upper and lower substrates.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements, wherein.

DETAILED DESCRIPTION OF THE PREFERRED EMBODIMENT

Reference will now be made in detail to a preferred embodiment of the present invention, the example of which is illustrated in the accompanying drawings.

Figure 1:
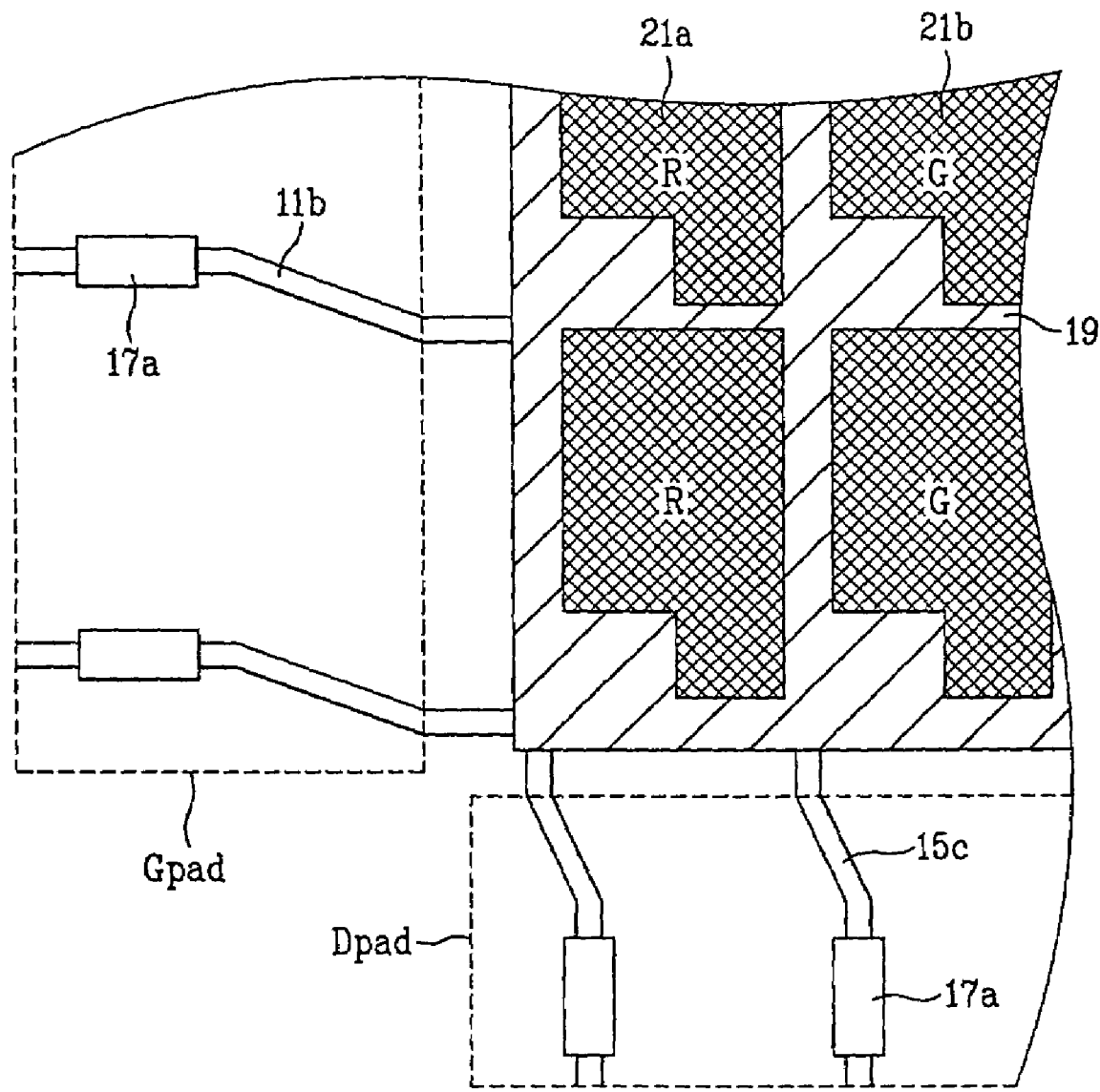
FIG. 1 is a plan view illustrating a related art LCD panel.
Figure 2A:
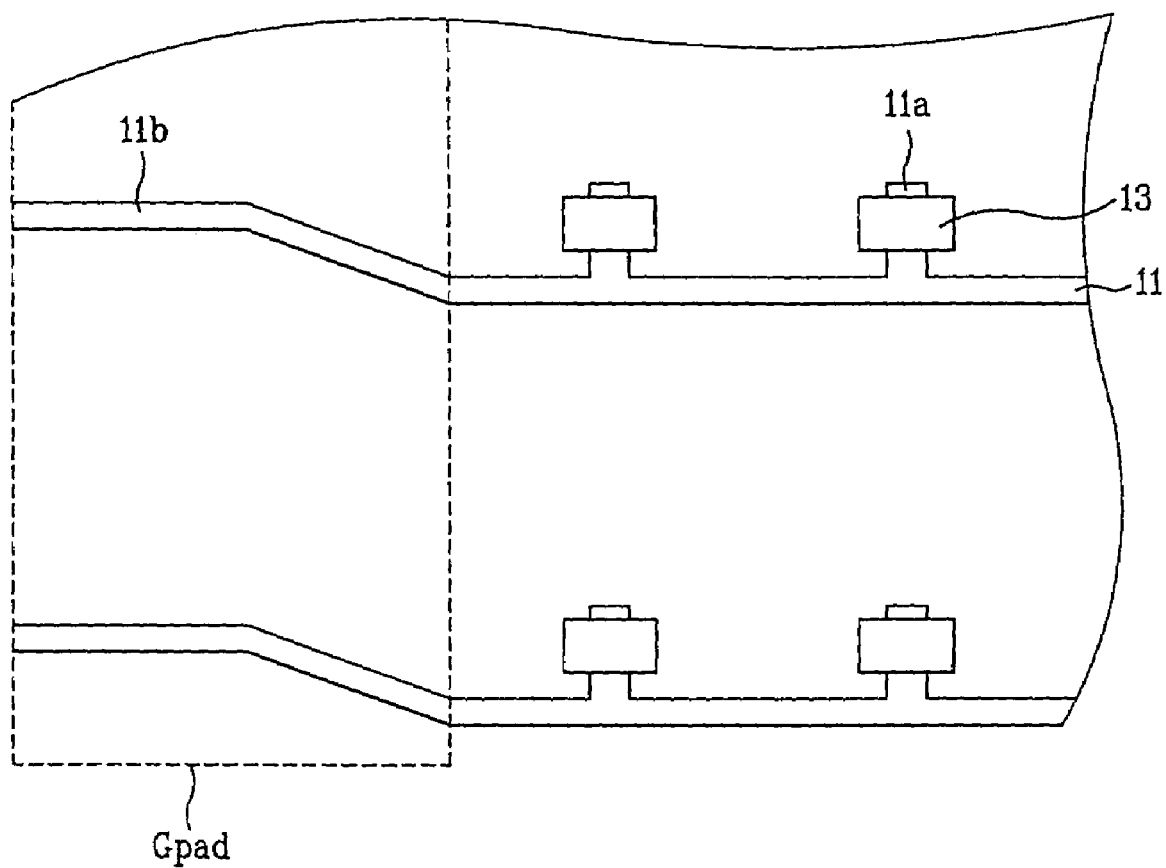
FIGS. 2A to 2E illustrate a related art method for manufacturing an LCD panel according to FIG. 1.
Figure 2B:
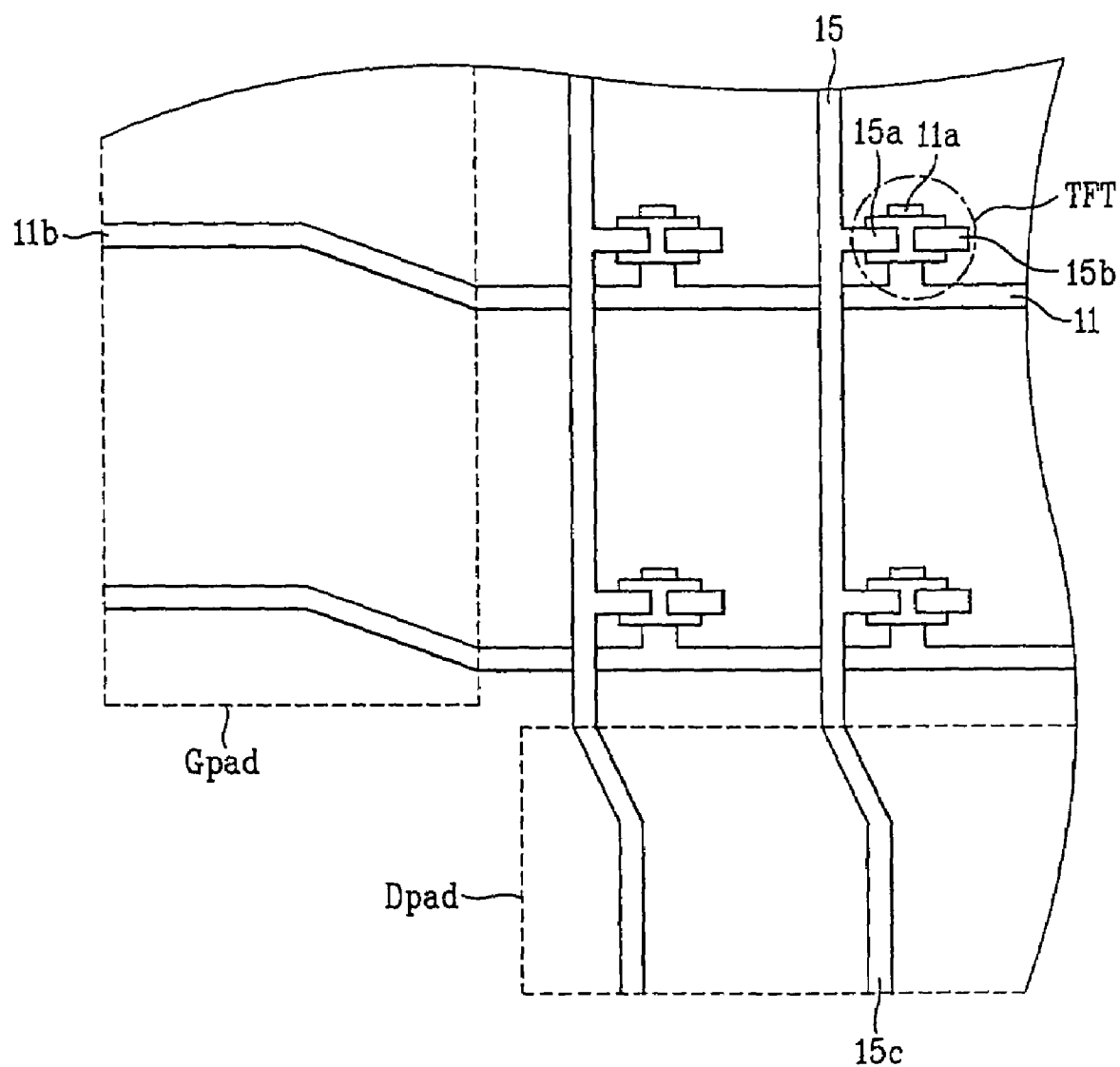
Figure 2C:
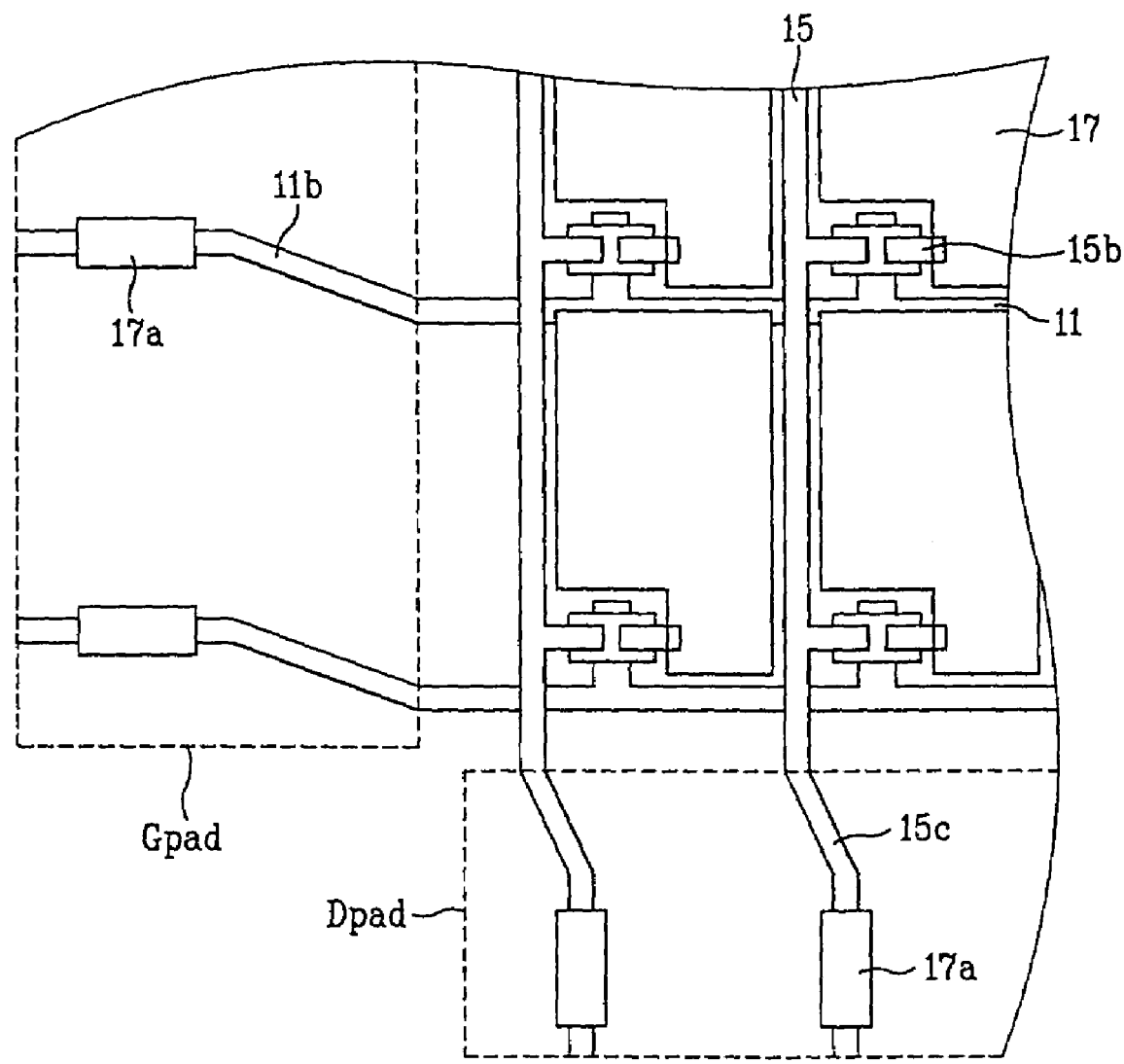
Figure 2D:
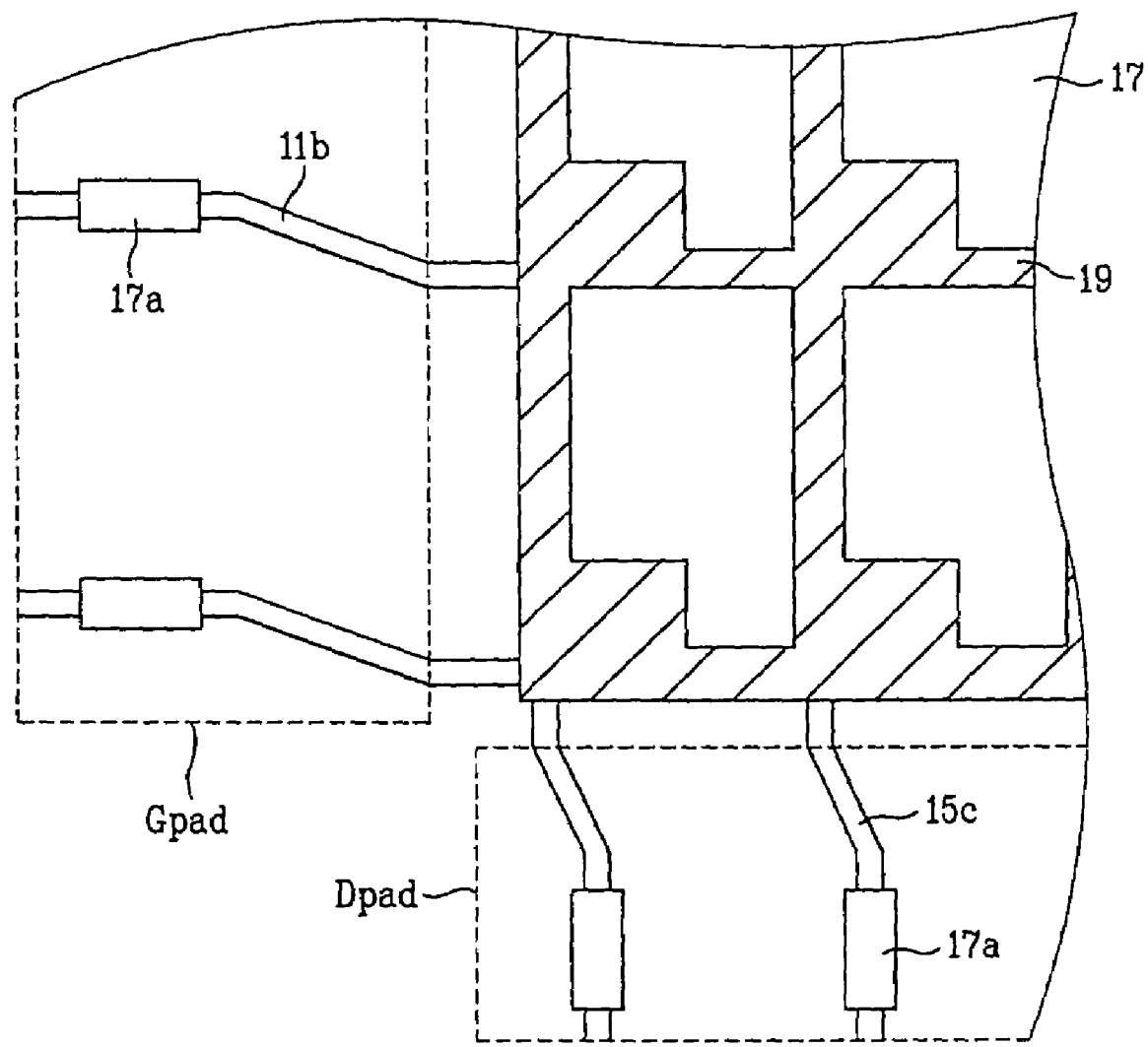
Figure 2E:
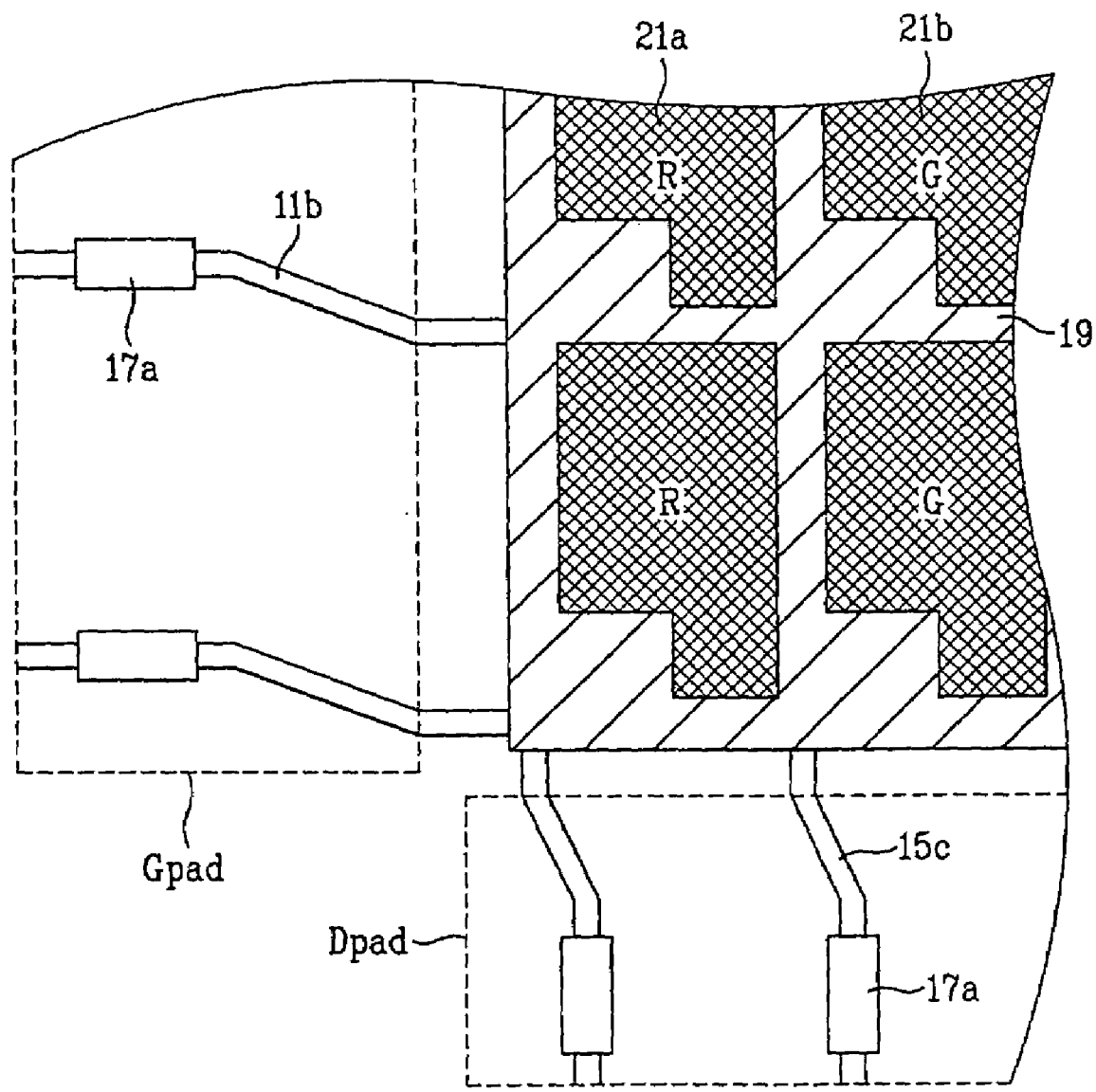
Figure 3A:
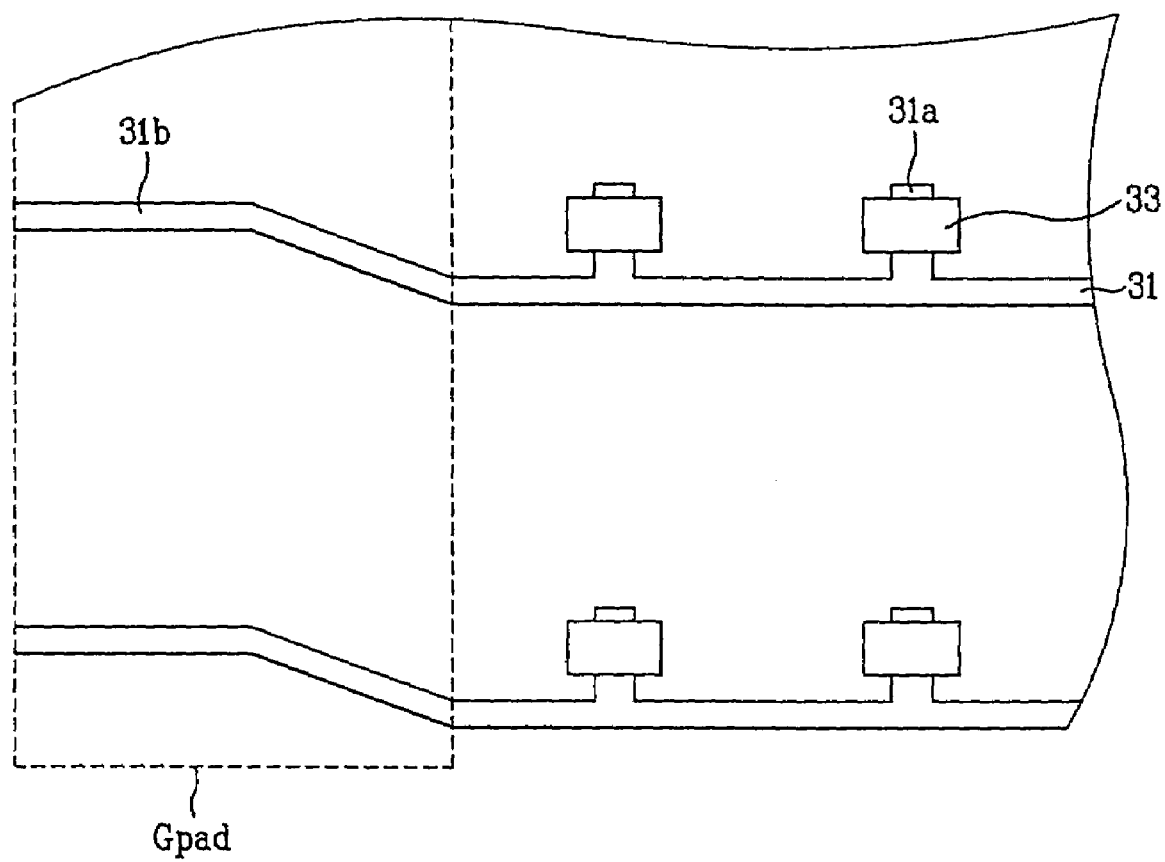
FIGS. 3A to 3E illustrate a method of manufacturing an LCD panel according to the principles of the present invention.
Figure 3B:
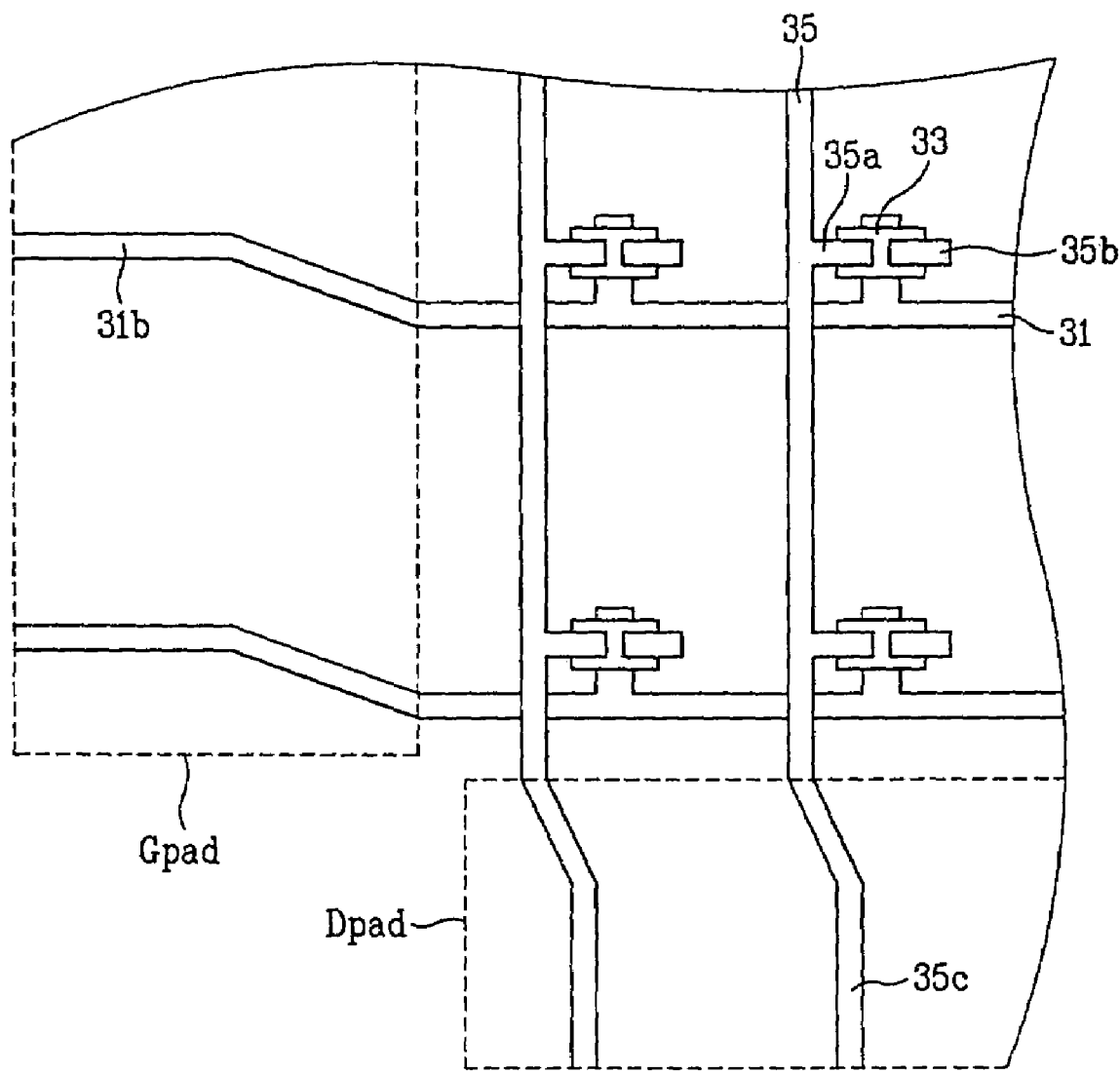

FIGS. 3A to 3E are plan views illustrating a method of manufacturing an LCD panel according to the principles of the present invention. As shown in FIG. 3A and FIG. 3B, a metal layer, such as Al, Mo, Cr, Ta or an Al alloy, is formed by sputtering on an insulating substrate. That substrate includes an active region, a gate pad region Gpad, and a data pad region Dpad. That metal layer is patterned to form a gate line 31 and a gate electrode 31a (in the active region) and a gate pad 31b (in the gate pad region Gpad). The gate pad 31b extends to form a single body with the gate line 31.

Afterwards, a gate insulating film (not shown) of $SiN_x$ or $SiO_x$ is formed on the exposed surfaces, including on the gate line 31 and the gate electrode 31a, by chemical vapor deposition. A semiconductor layer 33 is then formed on the gate insulating film and over the gate electrode 31a. The semiconductor layer 33 will act as a channel for a TFT.

Referring now to FIG. 3B, a metal layer, such as Al, Mo, Cr, Tr or an Al alloy, is then formed over the exposed surfaces, including over the semiconductor layer 33. That metal layer is patterned to form a data line 35 that crosses the gate line 31. Also formed are source and drain electrodes 35a and 35b (on the semiconductor layer 33) and a data pad 35c (in the data pad region Dpad). The data pad 35c extends to form a single body with the data line 35.

Figure 3C:
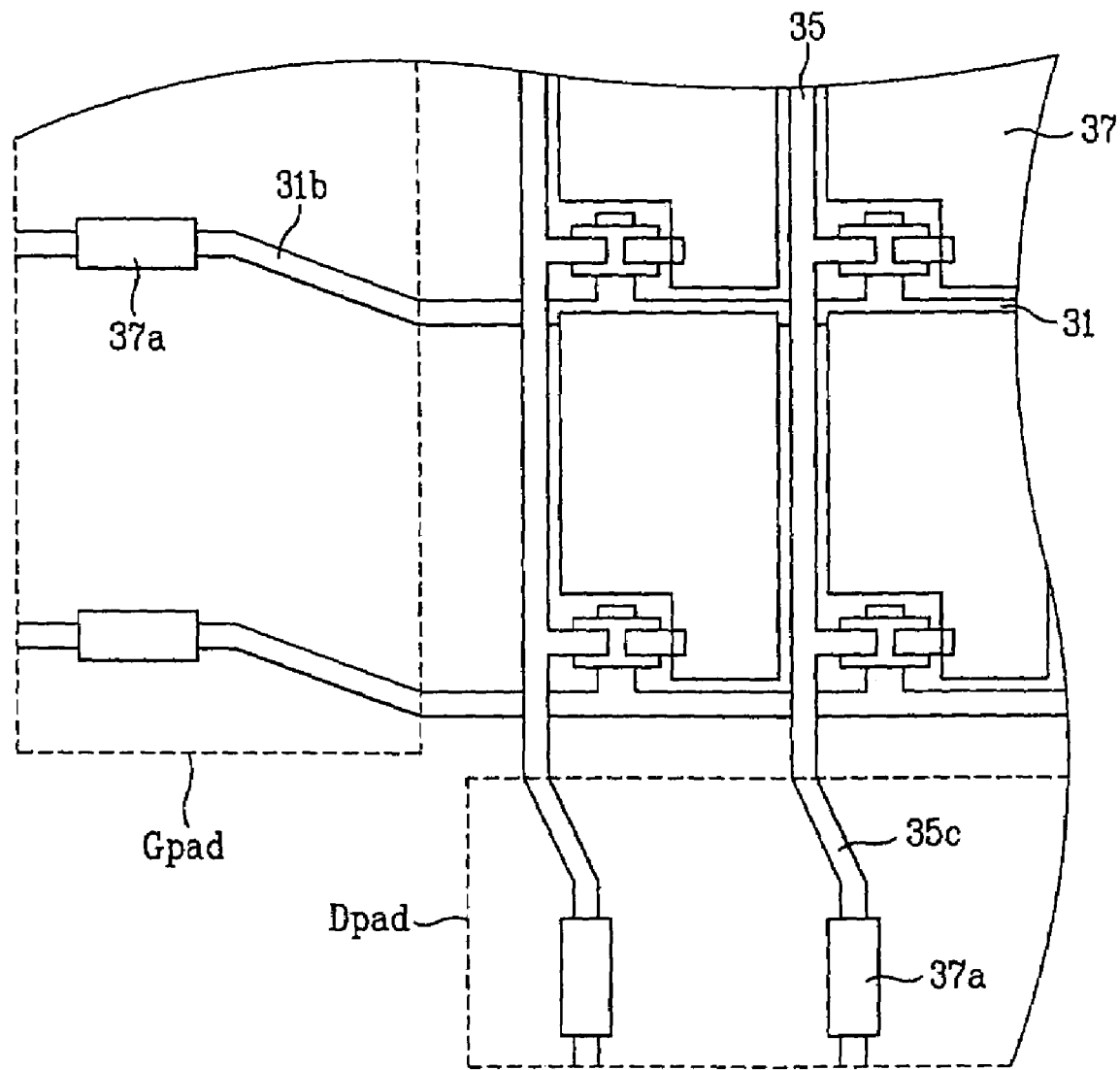

Referring now to FIG. 3C, a passivation film (not shown) is formed over the exposed surfaces, including over the source and drain electrodes 35a and 35b. A contact hole is formed to expose the drain electrode 35b. The gate and data pads 31b and 35c are also exposed.

Thereafter, a transparent conductive material, such as ITO, is formed over the exposed surfaces of the active region and of the pad region. The transparent conductive material is then patterned to form a pixel electrode 37 that connects to the drain electrode 35b through the contact hole. At the same time, the transparent conductive material is patterned to form transparent conductive films 37a that electrically connect to the exposed gate pad 31b and to the exposed data pad 35c. The transparent conductive films 37a are used to electrically connect the gate pad and the data pad to external circuitry so as to enable transmission of driving signals and image signals to the gate line 31 and to the data line 35.

Figure 3D:
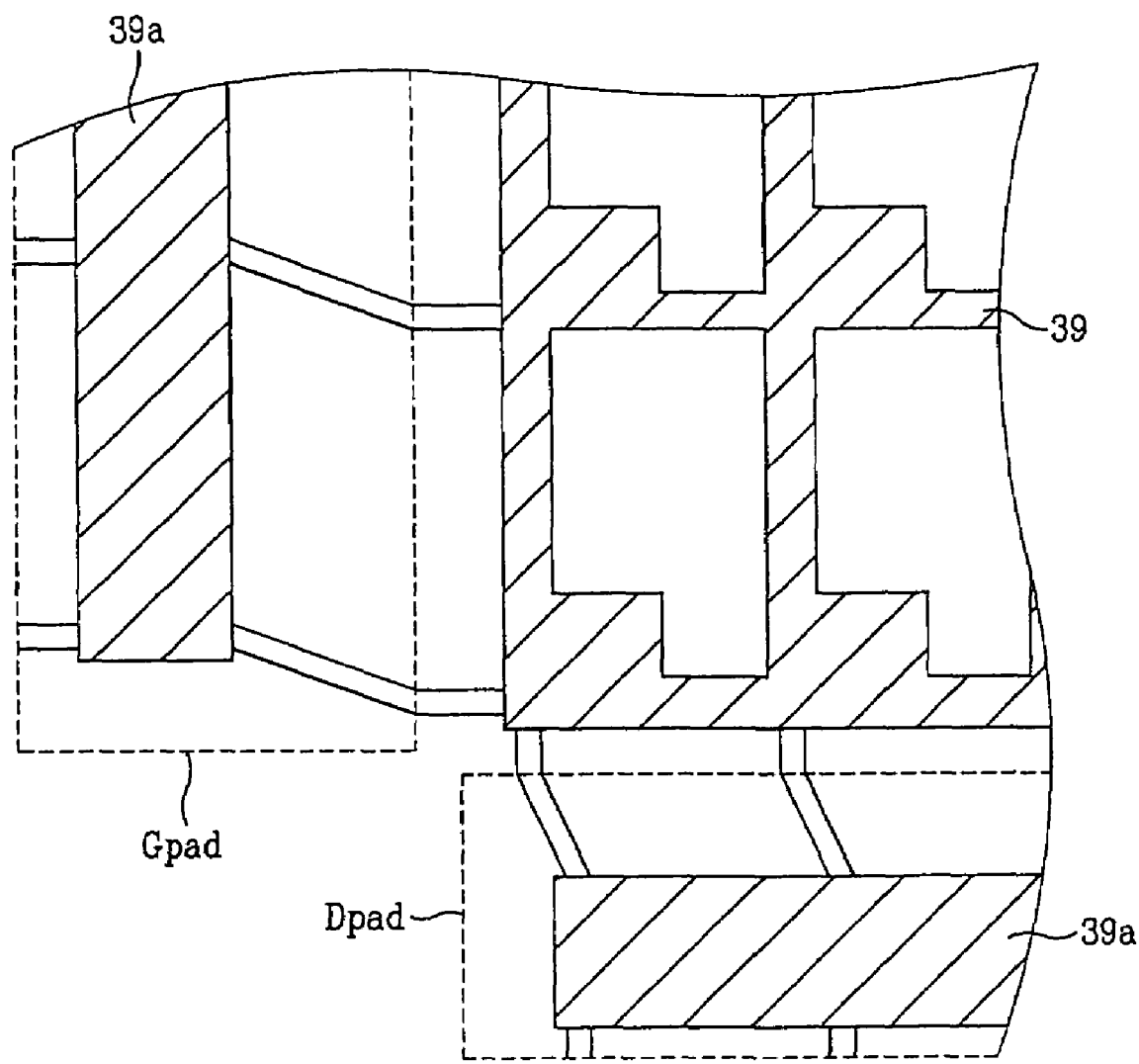

Referring now to FIG. 3D, a light-shielding material, beneficially a black resin, is then formed over the exposed surfaces. That light-shielding material is then patterned by selective etching to form a black matrix 39 in the active region and erosion barrier films 39a in the gate pad region Gpad and in the data pad region Dpad. The black matrix 39 prevents light from leaking around the gate line 31, the data line 35 and the TFT. The erosion barrier films prevent the transparent conductive films 37a (see FIG. 3C) from being exposed to aqueous solutions during subsequent electrodeposition of color filter materials. This prevents the transparent conductive films 37 from being eroded by the aqueous solutions.

Significantly, only one mask is required to form both the black matrix 39 and the erosion barrier films 39a. Furthermore, the same material is used for the matrix 39 and for the erosion barrier films 39a. Also, the erosion barrier films 39a are beneficially patterned such that the locations where a sealant will be printed does not contain an erosion barrier film 39a. This improves subsequent bonding of the insulating substrate with another substrate (see below).

Figure 3E:
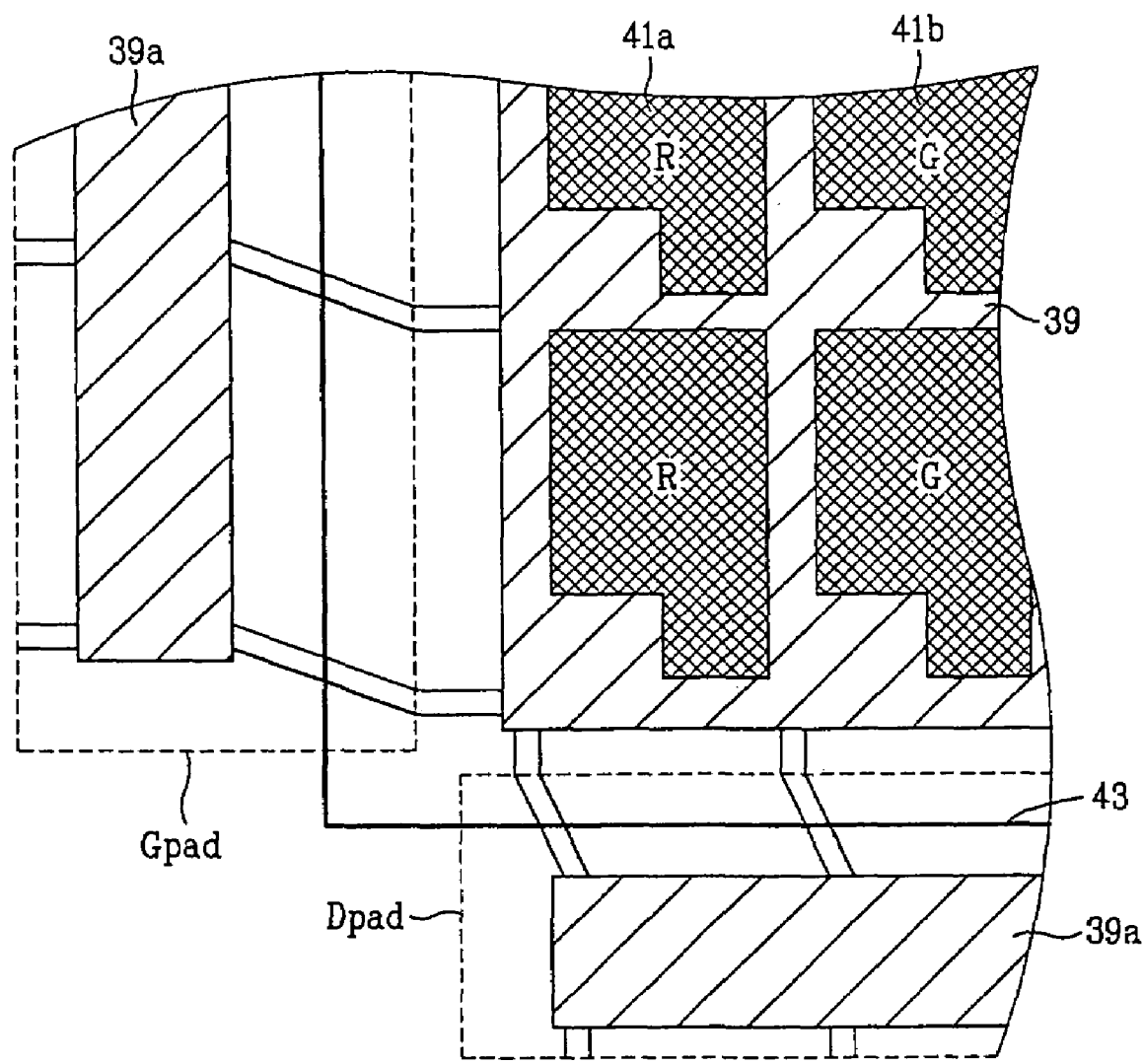

After the black matrix 39 and the erosion barrier films 39a are formed, the insulating substrate is dipped in an aqueous solution for forming a first color filter. A voltage is then applied to the pixel electrode where the first color filter layer will be formed. Thus, as shown in FIG. 3E, a first color filter 41a is formed on the pixel electrode 37. In the same way, a second color filter 41b is formed, and then a third color filter (not shown) is formed.

As shown, the first and second color filter 41a and 41b, as well as the third color filter, are formed in as stripes. However, the present invention is not limited to stripes.

A sealant 43 is then printed on the insulating substrate where the erosion barrier film 39a was removed. The insulating substrate is then attached to an opposing substrate. Finally, a liquid crystal is interposed between the insulating substrate and the opposing substrate. Thus, the process for manufacturing an LCD panel according to the principles of the present invention is complete.

The method of manufacturing an LCD panel according to the principles of the present invention has advantages. Since an erosion barrier film 39a is formed on a transparent conductive film, that transparent conductive film is not exposed in aqueous solutions that form color filters. Thus, transparent conductive film erosion by the aqueous solution is prevented, thereby improving the ohmic contact and device reliability. Furthermore, since the erosion barrier film is formed along with the black matrix and from the same material, no additional processing steps or masks are required. Additionally, since the erosion barrier film is not located where a sealant is printed, the upper and lower substrates attach with good adhesion.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of manufacturing an LCD panel, comprising:
   forming a TFT substrate having an active region and a pad region, wherein the active region has a signal line and a signal electrode, and the pad region has a signal pad having an electrical connecting portion;
   forming a light-shielding material layer over the active region and the pad region;
   patterning the light-shielding material layer to form a matrix pattern in the active region and an erosion barrier film in the pad region, wherein the erosion barrier film substantially covers the electrical connecting portion of the signal pad and is formed as an island separated from the matrix pattern; and
   forming a color filter in the active region after patterning the light-shielding material layer.

2. The method of claim 1, wherein the TFT substrate is formed by:
   forming a thin film transistor, including a drain electrode, in the active region;
   forming a passivation film over the active region and the pad region;
   removing sections of the passivation film to form the electrical connecting portion of the signal pad and to form a contact hole that exposes the drain electrode; and
   forming both a pixel electrode in the active region, wherein the pixel electrode electrically connects to the drain electrode, and a transparent conductive film on the signal pad.

3. The method of claim 2, wherein the signal line is formed to receive gate signals.

4. The method of claim 2, wherein the signal line is formed to receive data signals.

5. The method of claim 1, wherein the color filter is formed by electrodeposition.

6. The method of claim 1, wherein forming the light-shielding material layer includes depositing an organic material.

7. The method of claim 6, wherein the erosion barrier film is comprised of a same material as the matrix pattern.

8. The method of claim 1, wherein patterning the light-shielding material layer forms both the matrix pattern and the erosion barrier film with one mask.

9. The method of claim 1, wherein patterning the light-shielding material layer forms a black matrix.

10. An LCD panel, comprising:
    a TFT substrate having an active region, a gate pad region having a first electrical connecting portion, and a data pad region having a second electrical connecting portion;
    a matrix pattern in said active region;
    a first erosion barrier film substantially covering the first electrical connecting portion in said gate pad region;
    a second erosion barrier film substantially covering the second electrical connecting portion in said data pad region, wherein the matrix pattern is made of the same material as the first and second erosion barrier films and the first and second erosion barrier films are formed as an island separated from the matrix pattern; and
    color filters in said active region.

11. An LCD panel according to claim 10, wherein said TFT substrate includes:
    a gate line and a gate electrode in said active region, and a gate pad in said gate pad region;
    a gate insulating film over said gate line, over said gate electrode, over said gate pad, and over exposed surfaces of said TET substrate;
    a semiconductor layer on said gate insulating film and over said gate electrode;
    a data line in said active region and on said gate insulating film;
    source and drain electrodes on said semiconductor layer; and
    a data pad in said data pad region.

12. An LCD panel according to claim 11, wherein said first erosion barrier film is over said gate pad, said wherein said second erosion barrier film is over said data pad.

13. An LCD panel according to claim 11, wherein said TFT substrate includes a pixel electrode electrically connected to said drain electrode.

14. An LCD panel according to claim 10, wherein said matrix pattern forms a black matrix.

15. An LCD panel according to claim 14, wherein said color filters are disposed in openings of said black matrix.

16. A method of manufacturing an LCD panel, comprising:
    forming a TFT substrate having a gate line, a data line, a thin film transistor and a pixel electrode in an active region and a data pad and a gate pad in a pad region, wherein the thin film transistor includes a drain electrode and a source electrode on a semiconductor layer;

forming a light-shielding material layer over the TFT substrate;

removing the light-shielding material layer where a color filter and a sealant are to be located to form a matrix pattern in the active region and an erosion barrier film in the pad region, wherein the light-shielding material layer substantially remains over the data pad and the gate pad and the erosion barrier film is formed as an island separated from the matrix pattern;

electrodepositing the color filter, wherein the light-shielding material layer remaining substantially over the data pad and gate pad prevents the data pad and gate pad from being exposed to an aqueous solution during the electro-deposition of the color filter;

locating the sealant on the TET substrate;

attaching an opposing substrate to the TFT substrate; and interposing a liquid crystal layer between the TFT substrate and the opposing substrate.

17. The method of claim 16, wherein forming the TFT substrate includes:

forming the gate line, a gate electrode, and the gate pad;

forming a gate insulating film over the gate line, over the gate electrode, and over the gate pad;

forming the semiconductor layer on the gate insulating film and over the gate electrode;

forming the data line and the data pad on the gate insulting layer, and forming the source electrode and the drain electrode on the semiconductor layer; and forming the pixel electrode such that it is electrically connected to the drain electrode and forming transparent conductive films that are electrically connected to the gate pad and to the data pad.

18. The method of claim 16, wherein the color filter is electrodeposited from an aqueous solution.

* * * * *